(12) United States Patent
Matskewich et al.

(10) Patent No.: US 7,945,119 B2
(45) Date of Patent: May 17, 2011

(54) OPTIMIZING CHARACTER RENDERING

(75) Inventors: Tanya Matskewich, Kirkland, WA (US); Geraldine Wade, Redmond, WA (US); Gregory C. Hitchcock, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 994 days.

(21) Appl. No.: 11/768,833

(22) Filed: Jun. 26, 2007

(65) Prior Publication Data

US 2009/0003711 A1 Jan. 1, 2009

(51) Int. Cl.
*G06K 9/32* (2006.01)
(52) U.S. Cl. ........................................................ 382/299
(58) Field of Classification Search .................... 382/299
See application file for complete search history.

(56) References Cited

U.S. PATENT DOCUMENTS

| | | | | |
|---|---|---|---|---|
| 4,851,825 A * | 7/1989 | Naiman | ........................ | 345/596 |
| 5,373,375 A * | 12/1994 | Weldy | .......................... | 358/523 |
| 5,673,337 A * | 9/1997 | Gallo et al. | .................... | 382/187 |
| 5,696,848 A * | 12/1997 | Patti et al. | ...................... | 382/254 |
| 5,767,987 A * | 6/1998 | Wolff et al. | .................... | 358/447 |
| 5,910,805 A * | 6/1999 | Hickey et al. | ................. | 345/467 |
| 6,005,588 A * | 12/1999 | Guha | ............................. | 345/467 |
| 6,160,914 A * | 12/2000 | Muroya | ........................ | 382/187 |
| 6,563,502 B1 * | 5/2003 | Dowling et al. | ........... | 345/469.1 |
| 6,650,704 B1 * | 11/2003 | Carlson et al. | ........... | 375/240.01 |
| 7,352,374 B2 * | 4/2008 | Brown et al. | ................. | 345/613 |
| 2006/0072165 A1 * | 4/2006 | Erol et al. | ................ | 358/426.12 |
| 2007/0019887 A1 * | 1/2007 | Nestares et al. | ............. | 382/299 |

* cited by examiner

*Primary Examiner* — Samir A Ahmed
*Assistant Examiner* — Jayesh Patel
(74) *Attorney, Agent, or Firm* — Workman Nydegger (57) ABSTRACT

Optimizing objects output to a user. One method includes accessing a reference object of a character representing an idealized output. A different representation of the reference object is accessed. The reference object is compared to the representation of the reference object to generate an error metric. An optimization is applied to the representation of the reference object. The optimization is directed to causing the representation of the reference object to more closely approximate the reference object. Comparing objects and applying optimizations is repeated until an acceptable representation of the reference object is achieved. The acceptable representation of the reference object is displayed.

19 Claims, 4 Drawing Sheets

OPTIMIZING CHARACTER RENDERING

BACKGROUND

Background and Relevant Art

Computers and computing systems have affected nearly every aspect of modern living. Computers are generally involved in work, recreation, healthcare, transportation, entertainment, household management, etc.

Computers generally include hardware which allows the computer to output visual representations of data to a user. For example, computers may include a video card connected to a CRT monitor or LCD video screen which allows visual representations of objects including characters or other graphics to be displayed to the user. Similarly, many computers include the ability to interface with printers to provide visual representations of objects as a hard copy for a user.

Additionally, depending on the nature of the visual representations to the users, certain optimizations may be applied to make the visual representations more appealing or more readable. The optimizations applied may be dependent on the medium used for the visual representation. For example, LCD video screens are typically able to output data using a pixel resolution of about 110-120 pixels per inch. In contrast, printed representations can output data using a pixel resolution of 300, 600 or even higher dots per inch. Different optimizations may be applied to the object if it is intended to be displayed on an LCD video screen than are applied to an object if it is intended to be printed to a hard copy.

Common filtering techniques are applied generically. That is, they are not applied with specific reference to the topology of the object, its orientation, or its inherent characteristics, such as interior counter space, or even to the degree of knowledge of its surrounding neighborhood objects or lines. For example, a user can specify if, and to a limited degree, what type of filtering is to be applied. Any filtering is applied irrespective of the features of any given object that is being displayed to a user. For example, a user may specify that a given antialiasing filter, such as gray scaling, is to be applied. The filter is then applied indiscriminately to all characters displayed to the user.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment described herein includes a method for optimizing objects output to a user. The method includes accessing a reference object of a character representing an idealized output. A different representation of the reference object is accessed. The reference object is compared to the representation of the reference object to generate an error according to an error metric. An optimization is applied to the representation of the reference object. The optimization is directed to causing the representation of the reference object to more closely approximate the reference object. Comparing objects and applying optimizations is repeated until an acceptable representation of the reference object is achieved using the error metric. The acceptable representation of the reference object is displayed.

Some embodiments allow comparisons to be performed on different portions of an object, such as portions that include counter spaces, strokes, stems, serifs, crossbars, edges, diagonals, etc. Embodiments allow for comparisons to be made which include comparisons of based on CIE spaces (including S-CIELAB), contrast, stroke characteristics, openness of counter spaces, spectral characteristics, etc.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments herein may comprise a special purpose or general-purpose computer including various computer hardware, as discussed in greater detail below.

Previously, filtering has been applied to objects, including writing characters, based on the desire to optimize the perception generally of objects or characters. For example, a human user would specify whether or not to apply filtering and what filtering to apply. The filtering was then applied generally for all objects or characters. Embodiments described herein allow for optimizations to be applied based on particular characteristics of a character. Characters may include, for example, writing symbols in various languages, icon symbols, ASCII symbols, line drawing elements, etc. In some embodiments, different optimizations may be applied to different portions of the object or character with the final optimizing result being an aggregation of the different optimizations. Additionally, in some embodiments, optimizations may be applied in a recursive fashion where a comparison is made between a reference object and a representation of the reference object, and optimizing is applied to the representation of the reference object until the reference object is within some specified acceptable parameters with respect to the reference object. This allows for automated optimizing to be performed without the need for human intervention. This in turn, allows optimizing to be applied in a number of situations which have not been pre anticipated by a human user. Representation of a reference object is generally output device-dependent and therefore usually has more limitations than an idealized reference object. However, objects rendered to a user are based on some acceptable deviation from the reference object instead of simply on some desired output characteristics unrelated to a reference object. This also allows for using a reference object that does not necessarily conform to a given ideal, but still allows for outputting to a user a close approximation of the reference object.

Figure 1:
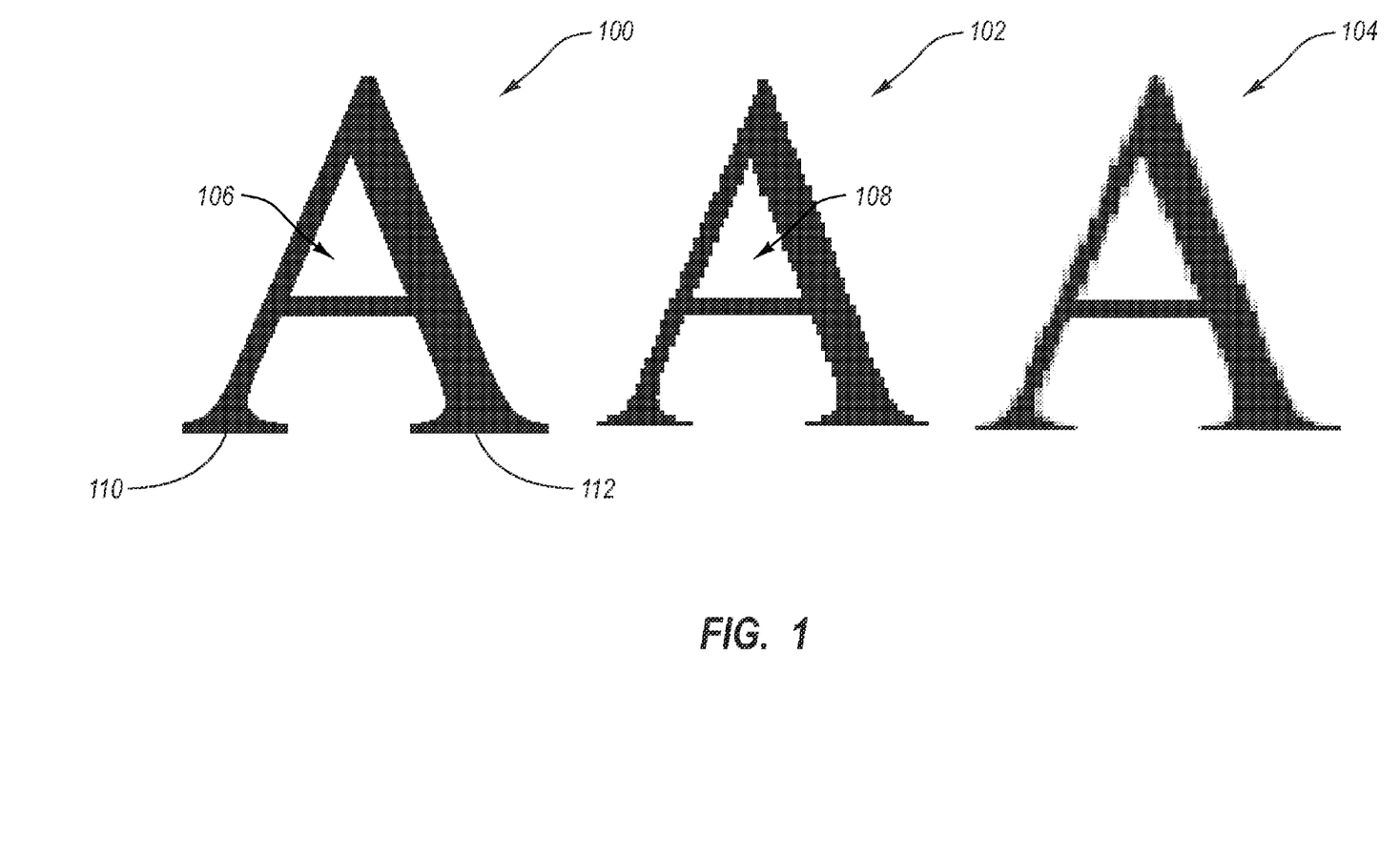
FIG. 1 illustrates a reference object, a representation of the reference object, and an optimized representation of the reference object.

Referring now to FIG. 1, an example of one embodiment is illustrated. FIG. 1 illustrates a reference object 100. In this example, the reference object 100 is a high resolution character object. Notably, the reference object may be any suitable object such as a high resolution rendition of the character, and outline representation of a character, a drawing on paper, or any other suitable reference object. Notably, the reference object does not necessarily need to be a high resolution or high quality object. Embodiments may be implemented where a higher quality object is degraded to more closely approximate a reference object. Characters may include, for example, writing symbols in various languages, icon symbols, ASCII symbols, line drawing elements, etc.

FIG. 1 further illustrates a representation 102 of the reference object 100. The representation 102 in this example has noticeable aliasing. Aliasing typically occurs because a visual output is limited to discrete units of display. For example, a computer LCD screen is typically limited to 100-120 whole pixels per inch. Thus, when characters are rendered using binary pixels, the number of pixels available with respect to the size of the character may result in whole pixel boundaries causing the jagged edges characteristic of aliasing.

In one embodiment, the representation 102 may be compared to the reference object 100. This may be accomplished by using an error metric, where one or more characteristics of the reference object 100 are compared to one or more characteristics of the representation 102. An error, or difference between the two, is calculated based on the comparison. For example, in one embodiment a point wise S-CIELAB error metric may be calculated between the reference object 100 and the representation 102.

Other comparisons may be performed on characters based on the common characteristics of characters as compared to general objects. For example, characters, including text bodies, tend to have higher spatial frequencies than general objects. Additionally, ideal representations of characters typically have very high contrast. For example, characters are generally black and white. Because of this, characters typically should be rendered such that there is an absence of visually perceived color. As such, a comparison of the reference object's, contrast, and perceived color can be compared to the, contrast, and perceived color of the representation 102.

Additionally, the interaction of background (e.g. paper or screen) color and the foreground (e.g. text or character) plays an important role in perception of contrast and perception of color.

Characters and fonts themselves have other common characteristics that are generally less relevant to general objects. For example, openness of the counter spaces, such as the counter space 106 in FIG. 1 is generally desirable. Additionally, it is generally desirable that strokes should be consistent. For example, strokes should be rendered without visual interruptions. Additionally, strokes should have consistent widths on stems or other features. For example, the letter "m" should be rendered such that each of the three stems is consistent with one another.

Thus, comparisons between the reference object 100 and the representation 102 may be made based on the expected common characteristics when the object is a character. A difference between a reference object 100 and a representation 102 can be calculated based on the characteristics to calculate an error based on an error metric. As will be described further herein, this error metric can then be used for applying other optimizations or for determining if the representation 102 is within a specified parameter range, such that the representation 102 is then output to a user.

Notably comparisons may be performed based on general characteristics of human or other species visual perception. Specifically, the physiology of human visual perception causes some types of differences between the reference object 100 and the representation 102 to be more perceptible and contribute to more dissatisfaction with the rendering of an object. For example, perceived colorfulness may be especially distracting. Thus, comparisons may be performed to compare a metric for the reference object 100 describing perceived colorfulness of all or a portion of the reference object 100 with a metric describing the perceived colorfulness of all or a portion of the representation 102. Similarly, imperfections in perceived contrast may also be distracting. It is important that the representation 102 of the reference object 100 will not significantly alter or degrade the local levels of perceived contrast as compared to the reference object 100.

Notably, some comparisons may be related to characteristics of human or other organic species visual perception for a specific group of individuals. For example, individuals with dichromatic vision may have different perception requirements from those who do not suffer from dichromatic vision. As such, some errors may be calculated using an error metric where a specific user or class of users, and their physiological perception characteristics are taken into account in the error metric calculation.

After a comparison has been made between the reference object 100 and the representation 102, optimizations may be applied to the representation 102 to create an updated representation 104. The optimizations are intended to cause the representation 104 to more closely approximate the reference object. Various optimizations may be performed. The optimizations are performed to minimize the error calculated using a given error metric. Generally, in one embodiment, optimizations are performed to vary pixel primary intensities or equivalent characteristics.

In one embodiment, applying optimizations to the representation of the reference object may include specifying an initial guess. For example, traditional filtering techniques such as gray scaling or ClearType filtering may be applied to the representation 102 to create the initial instance of the updated representation 104. Gray scaling shades pixels at the borders of characters using different shades of gray to create a perceived smoother edge. ClearType filtering, available from Microsoft Corporation of Redmond Wash., uses sub-pixel components, such as the red, green and blue sub-pixel components of pixels, to accomplish finer resolution of anti-aliasing. In the example shown in FIG. 1, the initial instance of updated representation 104 has had a gray scaling filter applied to smooth the edges of the representation 102.

An iterative process may then be performed whereby the updated representation 104 is compared to the reference object 100 and additional optimizations are applied to the updated representation 104 to further the optimization process by minimizing error calculated using error metrics. Each time the representation 102 is updated it may be compared to the reference object 100 where the comparison involves generating an error using an error metric describing the difference of one or more characteristics of the representation 102 to the reference object 100.

Error Metrics

Several different error metrics may be applied singly or in combination with other error metrics. Further, error metrics may be weighted such that some characteristic errors are weighted as being more important than other errors. Error metrics are implemented to achieve a reasonable evaluation of the difference, or a characteristic of a difference, between the representation 102 of the reference object 100 and the reference object 100.

One error metric relates to perceived contrast. For example, it is often desirable that text be perceived as a high contrast black and white object. Additionally, it is important that the representation 102 of the reference object 100 will not significantly alter or degrade the local levels of perceived contrast as compared to the reference object 100. Thus, the reference object 100, or portions of the reference object 100, may be evaluated for perceived contrast. The perceived contrast of the reference object 100 may be assigned some value. Similarly, the representation 102 of the reference object may be evaluated for perceived contrast. The perceived contrast of the representation 102 of the reference object is also assigned a value. An error is then calculated using the error metric by evaluating at least the difference between the value for the perceived contrast of the reference object 100 to the value for the perceived contrast of the representation 102. Similar evaluation, assignment of values and comparison may be performed for characteristics such as local luminance and chrominance and their derivatives such as perceived contrast or perceived colorfulness. For measuring, comparing and/or optimizing definite characteristics of an object, certain information is associated with the object. For example, an object typically includes information regarding the immediate surroundings of the object. Further, additional information commonly used in science of visual perception, such as information related to a wider surrounding, viewing conditions, and characteristics of an output device, is generally required and assumed to be known as a function of being associated with an object. This information may influence a measured characteristic and therefore an outcome of an error measurement and an optimization process.

Figure 2A:
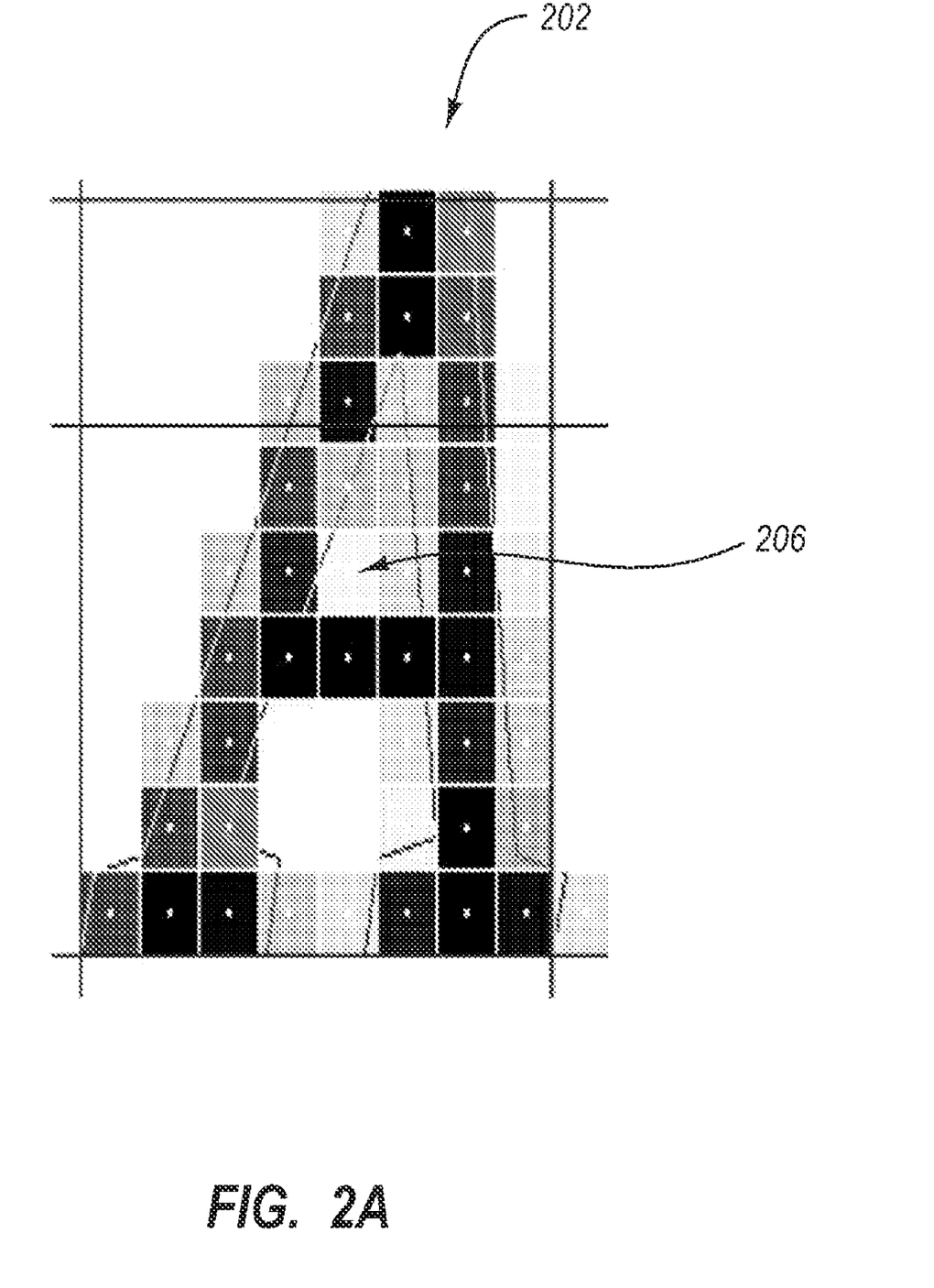
FIG. 2A illustrates a representation of a reference object using color shading.

Error metrics may be implemented for typographic characteristics. In particular, error metrics may be applied based on structural information including typographical entities such as strokes, serifs, counter spaces, etc; geometrical entities and characteristics such as boundaries, connected components, skeletons, orientations, etc; and relations between entities such as distance and relative orientation. Further, error metrics may be based on color information, including information related to foreground and background. Some typographic characteristics which may be evaluated include openness of counter-spaces, stroke collisions, stroke regularity, stroke consistency in rendering, and the like. For example, an error metric may be calculated based on the openness of the counter space 108 and the openness of the counter space 106. FIG. 2A illustrates a representation 202 where gray scaling of pixels has resulted in the counter space 206 appearing more closed. Thus, in one embodiment, an error metric error which includes at least a difference between the openness of the counter space of a representation, such as the representation 202, as compared to a reference object is calculated.

In one embodiment, a measure of a characteristic can be based on intensities of pixel primaries. Generally, for a representation of a reference object, intensities of the primaries or their equivalents are the degrees of freedom of the object. For a reference object, intensities of the primaries are not necessarily defined in a straightforward manner. For example, if a reference object is represented by a drawing on a paper, the measurements can be based on a spectral power distribution of the light reflecting from the paper.

In the example illustrated in FIG. 2A, openness of the counter-space 206 may be characterized, in one embodiment, by cumulative luminance over some area. The primary intensities of the counter space 206, may be used along with a measure of a reference object counter space measuring primary intensities of the reference object counter space to create an error according to an error metric. Another embodiment may calculate characteristics by calculating contrast. Contrast may be calculated, for example by evaluation of a first order derivative (or its approximation) in an appropriate space equipped with an appropriate measure of differences, that is, an internal metric of the space. For example, the internal metric may be implemented as a standard CIE difference. Examples of spaces may include standard CIE spaces (or their components), space of cone responses, spaces related to spectral characteristics, etc. More generally: measurements and comparisons of values or contrast in the spaces mentioned above can be performed.

Figure 2B:
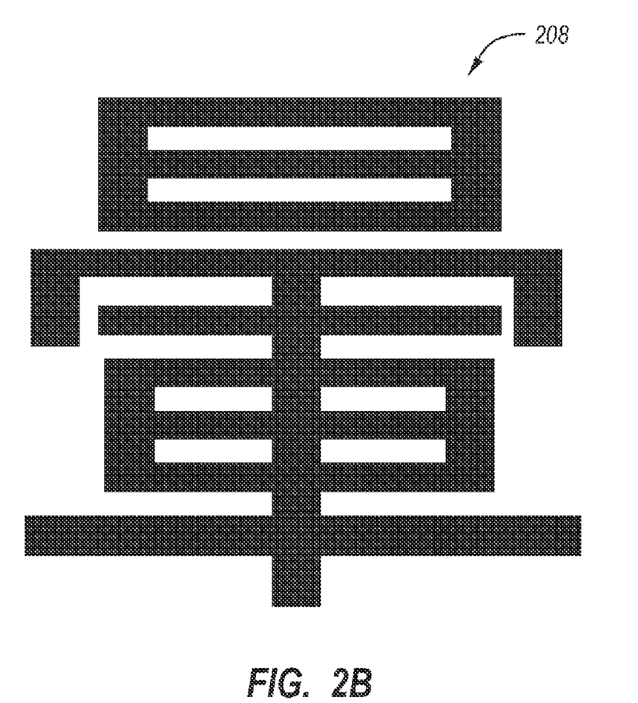
FIG. 2B illustrates a high resolution bitmap of a character.
Figure 2C:
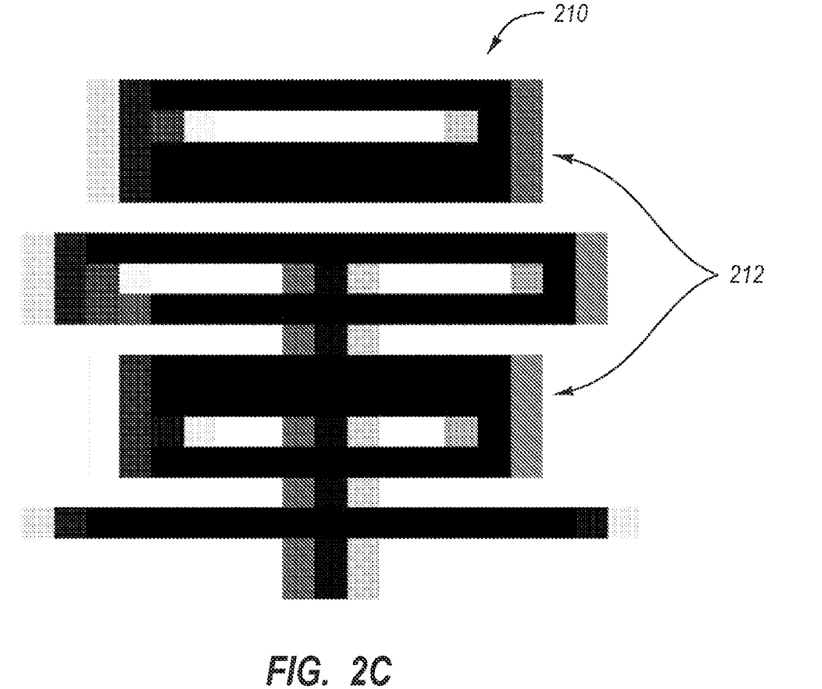
FIG. 2C illustrates a lower resolution bitmap of the character in FIG. 2B.

Another error metric that may be calculated relates to perception of collision of strokes. Collisions of strokes often occur when strokes are parallel or nearly parallel. For example, FIGS. 2B and 2C illustrate the effects of stroke collisions. FIG. 2B illustrates a high resolution bitmap of a character 208. FIG. 2C illustrates a representation 210 of the character 208, where the representation is a lower resolution bitmap of the character 208. As illustrated at 212, stroke collisions result because of the limitations due to the low resolution at which the representation 210 is presented. A metric may be implemented which defines the perception of collision of strokes of a reference object as compared to the perception of collision of strokes of a representation of the reference object. Similarly, error metrics may be calculated for regularity of a stroke, or consistency of a stroke rendering. For example, as illustrated above, a measure of stem consistency across a character may be compared to stem consistency for a different character.

Notably, a number the error metrics described herein are specifically directed to display characteristics when taking into account physiological characteristics of human or other organic species perception including, for example, characteristics of visual perception, characteristics of cognitive processes, or characteristics of recognition specific for a class of objects being evaluated. Thus, when an error metric is calculated, the error metric may include elements which take into account the physiological characteristics of a single human user, a group of human users, human perception in general, different animal species perception, etc. For example, a single human user may use various wizards or other interfaces to allow a system to determine the user's unique physiological characteristics. These characteristics could be quantified and used as operands in an error metric calculation. Similarly for a different error metric, known characteristics for a given group of users may be included as operands. For example, users with dichromatic vision, also known as colorblindness, have certain perception characteristics which can be described mathematically. These mathematical descriptions may be included as part of the error metric. Further, certain perception characteristics are common to major portions of the population. These perception characteristics can be described mathematically and included in error metric calculations. Another error metric that may be calculated relates to spatial similarities. Different groups of error metrics may treat spatial similarity in different ways, assuming that the spatial similarities are defined by specification of characteristics which should be compared and determination of representative locations/regions at which the characteristics are compared. In the simplest case, the representative locations reside on a regular grid and a point-by-point comparison of a characteristic will be performed. Other approaches to determining representative locations may allow for slight geometrical distortion. In this case the amount of distortion, or spatial similarity error, can be a part of an error metric and can be assigned a definite weight. Still another approach generalizes representative locations to representative regions and involves comparison of cumulative characteristics of the regions.

Notably, in some embodiments, when a spatial similarity error metric is calculated with other error metrics, the spatial similarity error metric may be given a lower error weight when compared to other error metrics when the other error metrics are deemed to have higher importance. For example, a geometric distortion, such as a slight shift in a feature, may be beneficial to achieve higher contrast, or some other characteristic. Thus, if higher contrast is deemed to have more importance than spatial similarity, then the spatial similarity error metric may have low or no penalty weight.

Errors based on error metrics may be calculated in a number of different ways. For example, in one embodiment, an error metric may be calculated by identifying one or more spaces for comparison where the spaces of representations of reference objects and corresponding reference objects are compared. One or more characteristics may be compared at each space. Characteristics at each space may be quantified, where the quantities are used in calculating the error metric. Notably, when multiple spaces and/or characteristics are quantified, an overall error metric may include weighting of different characteristics or characteristics at different spaces. Weighting allows for certain characteristics, or characteristics at certain spaces to be considered more important than others. Further, weighting may be applied to with respect to orientation of topology of text or objects.

In another embodiment, an error metric may be calculated based on important entities and the related characteristics of the entities of an object being rendered. For example, white space, strokes, skeletons, edges, orientations, distances etc. may be identified on a reference object and a representation of the reference object. Comparisons can then be made of the characteristics for these identified entities. Additionally, when multiple entities or characteristics are evaluated, relative weights may be assigned to characteristics of the entities based on relative importance of the entities or characteristics of the entities.

Optimizations

As discussed previously, a number of optimizations may be implemented. The optimizations may be performed to minimize an error for a given error metric. Thus, a number of the optimizations described herein correlate directly to a given error metric. Optimizations are generally performed to vary pixel primary intensities or an equivalent characteristic in a specified fashion.

One optimization involves an initial guess such as the initial application of grayscale filtering or ClearType filtering.

Optimizations may be applied globally or locally. Global optimizations are applied to an entire character object. Other optimizations may be applied locally such as to an area of an object such as a stroke, a stem, a crossbar, an interior space, a diagonal, an edge, etc. Alternatively, optimizations may be applied to a pre-specified portion of a particular size. For example, a geometric shape may define a region of an object to which an optimization is to be applied.

While the optimizations described below are generally described as improving some characteristic, it should be appreciated that an optimization may also degrade a characteristic if that is what is required to minimize an error to cause a representation of a reference object to more closely represent the reference object. Optimizations may be applied in a number of fashions. For example, optimizations may be applied locally or globally. In other words, the optimization processes may be limited in their scope to a given region of a character, or may be applied globally.

Optimizations may be applied in a conditional or adaptive fashion. For example, an error, or weights of error components, can be adjusted depending on some local characteristics of an object. The error or error weights may be adjusted by characteristics of either the reference object or the representation of the reference object.

Additionally, optimizations may be applied in a constrained fashion. For example, optimization may be limited to a space of resulting values. For example, intensities of the primaries, or their equivalents may be constrained to a maximum and/or minimum limit. Alternatively, intensities of the primaries may be constrained in such manner that will limit a resulting palette of colors.

Additionally, optimizations may be applied according to exit parameters. For example, optimizations may be applied only until an error falls below a maximum error threshold. Alternatively, optimizations may be applied a maximum number of iterations.

"Filter-Oriented" optimizations may be used to derive local adaptive filters, such as linear masks, which will be beneficial to apply repeatedly to some components or regions of different characters with some common properties. In this case filters' parameters, rather than intensities of primaries or their equivalent, become variables being optimized and an optimization is performed for a set of objects or for a set of representative entities rather than to a single character. As such, a derived filter can be later conditionally applied to a variety of characters.

One class of optimizations that may be applied includes applying optimizations which help to optimize interior counter spaces. For example, there may be a need to optimize an interior counter space of a representation of a reference object to more closely resemble the interior counter space of a reference object. For example, if an error metric calculates the difference between the openness of counter spaces, there may be a need to open interior counter spaces, such as interior counter space 106 shown in FIG. 1 to correspond more closely to a reference object. This may be done in a number of different ways. In one embodiment, optimizing interior counter spaces may be accomplished by using color to affect perception distance. In another embodiment a goal of an optimization process can be to achieve openness of the counter spaces while measuring perceived characteristics of the counter spaces, such as perceived extends which are dependent on the intensities of the primaries. Thus, an error metric may measure error between different interior counter spaces by comparing perceived distances. An optimization may be applied to optimize the perceived distances by using color.

Some optimizations utilized herein may use an orientation-dependent error metric. For example, the presence of definite colors in a representation of a reference object for a binary (black-and-white) reference object will be penalized more or less depending on an absolute direction or on a direction of some features of an object.

Ideally optimization applied to a class of objects (such as characters) should relate to a model of human recognition specific to the class of objects. Therefore ideally relative importance of different features of characters for human recognition may be reflected in an error metric. Thus, to reduce error in such an error metric, optimizations may be applied to facilitate better recognition of characters or words. Specifically, it has been shown that certain spacing or delimiters help to facilitate character and word recognition. Further, it can be shown that certain imperfections in character rendering are more detrimental than other imperfections in character or word recognition. As such, an optimization can be applied to facilitate character or word recognition. In one embodiment, an optimization corrects given spacings or delimiters to representation of an object to more closely represent those of a reference object.

Figure 3:
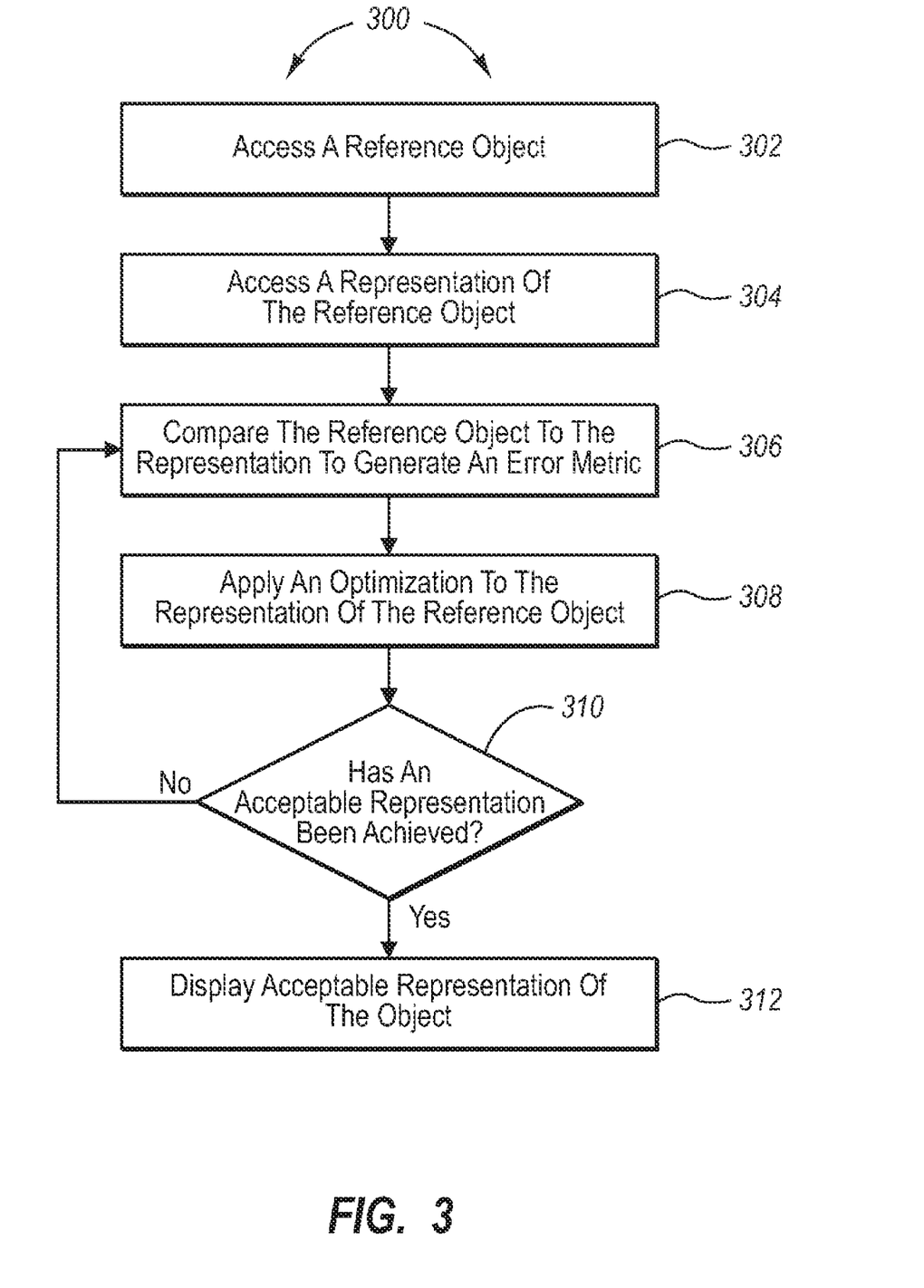
FIG. 3 illustrates a method of calculating an error metric and applying optimizations.

Referring now to FIG. 3, a method 300 is illustrated. The method 300 includes various acts for optimizing a representation of a reference object. The method 300 includes accessing a reference object (act 302). For example, the reference object may be a high-resolution rendition of a character, an outline representation of a character, a paper drawing of a character, or other suitable representation. FIG. 1 illustrates a reference object 100 as an example.

The method 300 further includes an act of accessing a representation of the reference object (act 304). FIG. 1 illustrates a representation 102 that may be accessed. The representation 102 may be a representation that is limited by some factor such as pixel resolution of a display medium or some other limitation. Alternatively the representation may simply be any attempt at rendering the reference object.

FIG. 3 further illustrates comparing the reference object to the representation of the reference object to create an error metric (act 306). The error metric may be calculated in a number of ways. For example, the error metric may include a comparison of all or part of an object. The comparison may be such that the error metric may include comparisons of pixel intensities, luminosity, chrominance, spectral characteristics, contrast, cone responses of a human or other species observer, etc. The comparison may be on particular characteristics of a space or entity of an object. For example, comparisons may be made on white space, strokes, skeletons, edges, diagonal edges, straight edges, stems, crossbars, interior spaces, etc. Additionally, comparisons may be of a global nature, where a cumulative error is evaluated for an entire object being optimized.

Referring again to FIG. 3, the method 300 includes applying an optimization to the representation. An example of this is illustrated in FIG. 1, where an optimization is applied to the representation 102 to create the optimized representation 104. As noted, any one of a number of optimizations may be applied. For example, an optimization can applied to vary perceived luminance, chrominance and their derivatives such as perceived brightness, colorfulness or contrast. An optimization may be applied to vary consistency of strokes or to vary other character regularity. Notably, some optimizations may be applied to specific areas of an object. For example, when the object is a character, optimization may be applied to an area based on the area containing one or more of a stroke, a stem, an interior counter space, a crossbar, a diagonal, an edge, etc. For example, optimizations may be applied to vary the openness of counter spaces. Optimizations may be applied based on stroke continuity. Other optimizations may be applied based on stems consistency in one or more characters.

Referring once again to FIG. 3, block 310 illustrates that acts 306 and 308 are repeated until an acceptable representation has been achieved. Determination that an acceptable representation of the reference object has been achieved may be accomplished in a number of different ways. For example, calculating an error metric may be done in such a fashion that the error metric produces a quantity defining the difference between a reference object and a representation of the reference object. Additionally, the difference threshold may be specified for a given error metric. In one embodiment, when the difference between a reference object and a representation of the reference object is below the threshold specified for a given error metric, no more optimizations are applied to the representation of the reference object. In another embodiment, either the threshold requirement is met, or a pre-specified number of optimizations may be applied. For example, if optimizations are applied, and the difference between the reference object and the representation of the reference object does not fall below the specified threshold after a pre-specified number of optimizations, or iterations of optimizations have been applied, then the system will stop applying optimizations and use a representation of the reference object with the smallest error metric. In some embodiments, rather than specifying a threshold, a system may simply apply a given number of iterations of optimizations or a certain set of optimizations where the representation of the reference object using the optimization or set of optimizations that produces the lowest error metric is used.

Referring once again to FIG. 3, FIG. 3 illustrates an act of displaying an acceptable representation of the reference object (act 312). Thus an acceptable representation of the reference object as determined by an error metric or the application of a given number of optimizations or iterations of optimizations is displayed to a user. Displaying to a user may be accomplished in a number of different fashions including but not limited to displaying on the screen, printing to a hard copy, outputting to a virtual video adapter such as is used in remote desktop applications, or any other suitable display.

Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, which is implemented in a computing environment including a computing system configured to output objects to a user, of optimizing objects output to the user, the method comprising:
    a) accessing a reference object of a character, wherein the reference object represents an idealized output of the character;
    b) accessing a representation of the reference object, wherein the representation of the reference object is limited as compared to the reference object by at least one factor corresponding to a particular display medium that is to display the representation of the reference object;
    c) comparing the reference object to the representation of the reference object to generate an error according to an error metric;
    d) applying an optimization to the representation of the reference object, based at least in part on the error metric defining differences between the reference object and the representation of the reference object, the optimization directed to causing the representation of the reference object to more closely approximate the reference object;
    e) repeating acts c and d until an acceptable representation of the reference object is achieved as specified by a predefined condition; and
    f) displaying the acceptable representation of the reference object with the particular display medium.

2. The method of claim 1, wherein the reference object comprises at least one of a high-resolution rendition of a character, an outline representation of a character, or a drawing of a character.

3. The method of claim 1, wherein applying an optimization comprises varying pixel primaries or an equivalent characteristic.

4. The method of claim 1, wherein comparing the reference object to the representation of the reference object comprises comparing typographic characteristics.

5. The method of claim 4, wherein the typographic characteristics include openness of counter spaces.

6. The method of claim 4, wherein the typographic characteristics include consistency of strokes.

7. The method of claim 1, wherein applying an optimization to the representation of the reference object comprises optimizing at least one of local luminance or chrominance or their derivatives including at least one of as perceived brightness, colorfulness or contrast.

8. The method of claim 1, wherein applying an optimization to the representation of the reference object comprises applying an optimization based on human or other species visual perception corresponding to at least one of a color, a contrast or a luminance and cognitive recognition.

9. The method of claim 1, wherein applying an optimization to the representation of the reference object comprises applying an optimization for a specific group of users.

10. The method of claim 1, wherein applying an optimization to the representation of reference object is performed with respect to background information of the object.

11. The method of claim 1, wherein applying an optimization to the representation of reference object is performed with respect to the object's closest surrounding neighborhood.

12. The method of claim 1, further comprising applying an optimization to parameters of a conditional filter, such that the conditional filter can be conditionally applied to components sharing common characteristics.

13. A computer storage device comprising stored computer executable instructions which, when executed by a processor of a computing system, cause the computing system to perform the following:
    a) access a reference object of a character, wherein the reference object represents an idealized output of the character;
    b) access a representation of the reference object, wherein the representation of the reference object is limited as compared to the reference object by at least one factor corresponding to a particular display medium that is to display the representation of the reference object;
    c) compare the reference object to the representation of the reference object to generate an error metric;
    d) apply an optimization to the representation of the reference object, based at least in part on the error metric defining differences between the reference object and the representation of the reference object, the optimization directed to causing the representation of the reference object to more closely approximate the reference object;
    e) repeat acts c and d until an acceptable representation of the reference object is achieved as specified by a predefined condition; and
    f) display the acceptable representation of the reference object with the particular display medium.

14. The computer storage device of claim 13, wherein the reference object comprises at least one of a high-resolution rendition of a character, an outline representation of a character, or a paper drawing of a character.

15. The computer storage device of claim 13, wherein applying an optimization comprises varying pixel primaries.

16. The computer storage device of claim 13, wherein comparing the reference object to the representation of the reference object comprises comparing typographic characteristics.

17. The computer storage device of claim 16, wherein the typographic characteristics include openness of counter spaces.

18. The computer storage device of claim 16, wherein the typographic characteristics include consistency of strokes.

19. A computing system comprising the following:
    a processor;
    a computer memory comprising computer executable instructions that when executed by the processor, cause the following acts to be performed:
    a) accessing a reference object of a character, wherein the reference object represents an idealized output of the character;
    b) accessing a representation of the reference object, wherein the representation of the reference object is limited as compared to the reference object by at least one factor corresponding to a particular display medium that is to display the representation of the reference object;

c) comparing the reference object to the representation of the reference object to generate an error metric;

d) applying an optimization to the representation of the reference object, based at least in part on the error metric defining differences between the reference object and the representation of the reference object, the optimization directed to causing the representation of the reference object to more closely approximate the reference object;

e) repeating acts c and d until an acceptable representation of the reference object is achieved as specified by a predefined condition; and f) displaying the acceptable representation of the reference object with the particular display medium.

* * * * *